United States Patent
Kweon et al.

(10) Patent No.: US 6,210,834 B1
(45) Date of Patent: Apr. 3, 2001

(54) ACTIVE MATERIAL FOR POSITIVE ELECTRODE USED IN LITHIUM SECONDARY BATTERY AND METHOD OF MANUFACTURING SAME

(75) Inventors: Ho-Jin Kweon; Geun-bae Kim, both of Cheonan; Dong-gon Park, Seoul, all of (KR)

(73) Assignee: Samsung Display Devices Co., Ltd. (KR)

( * ) Notice: Subject to any disclaimer, the term of this patent is extended or adjusted under 35 U.S.C. 154(b) by 0 days.

(21) Appl. No.: 09/306,345

(22) Filed: May 6, 1999

(30) Foreign Application Priority Data

May 13, 1998 (KR) .................................................. 98-17061

(51) Int. Cl.[7] .............................. H01M 4/52; H01M 4/66
(52) U.S. Cl. .................................... 429/231.3; 429/231.1; 429/231.6; 429/223
(58) Field of Search ................................. 429/231.1, 223, 429/231.3, 231.6; 423/192, 147

(56) References Cited

U.S. PATENT DOCUMENTS 4,980,080 * 12/1990 Lecerf et al. .
5,478,673 * 12/1995 Funatsu .
5,478,674 * 12/1995 Miyasaka .
5,780,181 * 7/1998 Idota et al. .
5,871,863 * 2/1999 Miyasaka .
6,045,771 * 4/2000 Matsubara et al. .

\* cited by examiner

Primary Examiner—Geoffrey S. Evans
Assistant Examiner—Jonathan John
(74) Attorney, Agent, or Firm—Blakely Sokoloff Taylor & Zafman

(57) ABSTRACT

Disclosed is active material for a positive electrode used in lithium secondary batteries of Formula 1 below and a method of manufacturing the active material. The active material includes large particles of 1 to 25 $\mu$m formed of a plurality of minute particles of 0.4 to 0.7 $\mu$m. The method includes the steps of adding a chelating agent to a mixture derived by dissolving lithium salt, nickel salt and cobalt salt in a solvent to a molar ratio of 0.95–1.06: 0.5–1:0–0.5; producing a gel by heating the mixture; for precursor by thermally decomposing the gel; and heat treating the precursor.

$$Li_xNi_{1-y}Co_yO_2 \quad \text{[Formula 1]}$$

where x is between 0.95 and 1.06, and y is between 0 and 0.5.

5 Claims, 7 Drawing Sheets

ACTIVE MATERIAL FOR POSITIVE ELECTRODE USED IN LITHIUM SECONDARY BATTERY AND METHOD OF MANUFACTURING SAME

BACKGROUND OF THE INVENTION (a) Field of the Invention

The present invention relates to active material for a positive electrode used in lithium secondary batteries, and more particularly to active material for a positive electrode used in lithium second batteries in which the active material has improved electrochemical characteristics and a capacity of the active material can be adjusted. The present invention also relates to a method of manufacturing the active material in which particles of the active material can be made uniformly and to minute sizes.

(b) Description of the Related Art

With the proliferation in the use of portable electronic devices in recent times, coupled with advancements made enabling increasingly smaller sizes and weights for these devices, research is being actively pursued to improve energy density capabilities of lithium secondary batteries.

Lithium secondary batteries utilize material that is able to undergo lithium ion intercalation and deintercalation respectively for a negative electrode and a positive electrode, and are filled with organic electrolyte or polymer electrolyte, which enable movement of lithium ions inside the battery (i.e., back to the negative electrode in the form of an ionic current). The lithium secondary battery generates electrical energy by processes of oxidation and reduction which take place when lithium ions undergo intercalation and deintercalation in the negative electrode and the positive electrode, respectively.

In the past, although lithium metal was used as the negative electrode active material in lithium secondary batteries, a serious problem of dendrite forming on a surface of the lithium metal resulted during charging and discharging. This may cause a short circuit, or more seriously may lead to the explosion of the battery. To prevent such problems, carbonaceous material is now widely used for the negative active material. Carbonaceous material is able to alternatingly either receive or supply lithium ions while maintaining its structural integrity and electrical properties, and half of a potential of the cell is identical to that of lithium metal during insertion and separation of ions.

For the active material of the positive electrode in secondary batteries, a metal chalcogenide compound, enabling insertion and separation of lithium ions, is generally used, i.e. composite metal oxides such as $LiCoO_2$, $LiMn_2O_4$, $LiNiO_2$, $LiNi_{1-x}Co_xO_2$ (0<X<1), and $LiMnO_2$. Regarding the advantages and disadvantages of these different materials: the Mn-based active materials, $LiMn_2O_4$, and $LiMnO_2$, can easily synthesize, are less expensive than the other materials and give minimal negative affects on the environment, but capacities of these materials are low; $LiCoO_2$ is widely used as it exhibits an electrical conductivity of roughly $10^{-2}$ to 1 S/cm at room temperature, provides a high level of battery voltage, and has exceptional electrode characteristics, but is unsafe when charging or discharging at a high rate, and is more costly than the other materials; and $LiNiO_2$ has a high discharge and charge capacity and is the least expensive of the above active materials for the positive electrode, but does not synthesize easily.

Generally, such composite metal oxides are manufactured by mixing with a solid raw material powder, and this mixture undergoes a solid phase reaction for providing plasticity to the mixture. For example, Japanese Laid-open Publication No. Heisei 8-153513 (Sony Corp.) discloses a method for manufacturing $LiNi_{1-x}Co_xO_2$ (0<X<1) in which after a hydroxide containing $Ni(OH)_2$ and $Co(OH)_2$ or Ni and Co is mixed and heat treated, the hydroxide is ground and fractionated to diameter sizes of the particles. In another method, LiOH, Ni oxide and Co oxide are reacted, and after undergoing a first sintering at 400 to 580° C. to form an oxide, a second sintering is performed at 600 to 780° C. to manufacture a perfect crystalline active material.

However, in the above conventional methods for manufacturing the composite metal oxides, a synthesis temperature is high; a particle size of the reaction material is large; and it is difficult to control physical properties such as particle shape, and surface and pore characteristics of the produced active material. Since the physical properties of such active materials greatly affect electrochemical characteristics of the battery, there is a need for a method enabling the physical properties of the electrode materials to be freely adjusted, thereby maximizing the characteristics of the battery.

SUMMARY OF THE INVENTION

The present invention has been made in an effort to fulfill the above need.

It is an object of the present invention to provide active material for a positive electrode used in lithium secondary batteries in which physical characteristics such as a size of particles and surface characteristics are adjusted by changing a lithium equivalent contained in a composite metal oxide, thereby attaining exceptional electrochemical properties.

It is another object of the present invention to provide a method of manufacturing active material for a positive electrode used in lithium secondary batteries in which grinding and fractionating steps in an active material synthesis process are skipped, a synthesis temperature is reduced while a heat-treating time used in synthesis is reduced, and the generation of a minor phase is prevented.

To achieve the above objects, the present invention provides active material for a positive electrode used in lithium secondary batteries of Formula 1 below, the active material including large particles of 1 to 25 μm formed of a plurality of minute particles of 0.4 to 0.7 μm.

Further, the present invention provides a method manufacturing active material for a positive electrode used in lithium secondary batteries of Formula 1 including the steps of adding a chelating agent to a mixture derived by dissolving lithium salt, nickel salt and cobalt salt in a solvent to a molar ratio of 0.95–1.06:0.5–1:0–0.5; producing a gel by heating the mixture; forming an organic-inorganic precursor by thermally decomposing the gel; and heat treating the precursor.

[Formula 1]

where x is between 0.95 and 1.06, preferably between 1.01 and 1.05, and y is between 0 and 0.5.

BRIEF DESCRIPTION OF THE DRAWINGS

Further objects and other advantages of the present invention will become apparent from the following description in conjunction with the attached drawings, in which.

DETAILED DESCRIPTION OF THE PREFERRED EMBODIMENTS

Figure 1A:
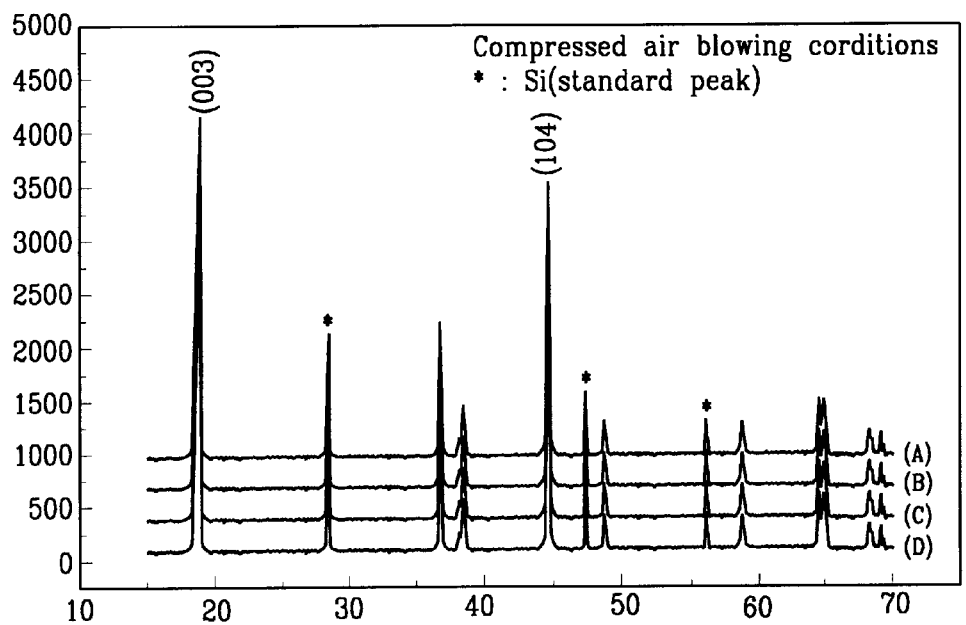
FIGS. 1a and 1b are graphs illustrating X-ray diffraction patterns of active material for a positive electrode used in secondary lithium batteries according to the present invention.

The present invention relates to active material for a positive electrode used in lithium secondary batteries of Formula 1 below, the active material including large particles of 1 to 25 $\mu$m formed of a plurality of minute particles of 0.4 to 0.7 $\mu$m.

Further, the present invention relates to a method of manufacturing active material for a positive electrode used in lithium secondary batteries of Formula 1. The method includes the steps of adding a chelating agent to a mixture derived by dissolving lithium salt, nickel salt and cobalt salt in a solvent to a molar ratio of 0.95–1.06:0.5–1:0–0.5; producing a gel by heating the mixture; forming an organic-inorganic precursor by thermally decomposing the gel; and heat treating the precursor.

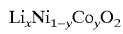  [Formula 1]

where x is between 0.95 and 1.06, preferably between 1.01 and 1.05, and y is between 0 and 0.5.

The inventive active material for a positive electrode used in lithium secondary batteries of Formula 1, the active material including large particles of 1 to 25 $\mu$m formed of a plurality of minute particles of 0.4 to 0.7 $\mu$m, is manufactured using the method described below.

A metal solution is produced by dissolving lithium salt, nickel salt and cobalt salt in a solvent to a molar ratio of 0.95–1.06:0.5–1:0–0.5, after which a chelating agent is added to the metal solution. Although many different chemicals can be used for the lithium salt, nickel salt and cobalt salt, it is preferable that the lithium salt is selected from the group including lithium nitrate, lithium acetate, lithium carbonate and lithium hydroxide; the nickel salt is selected from the group including nickel nitrite and nickel acetate; and the cobalt salt is selected from the group including cobalt nitrite, cobalt hydroxide, cobalt carbonate and cobalt acetate. Also, it is preferable that the solvent is selected from the group including distilled water, ethanol and methanol. In addition to the lithium salt, nickel salt and the cobalt salt, it is possible to further add to the metal salt solution, a metal salt selected from the group including Mg, Al and Mn.

Regarding the chelating agent, an organic polymer material having a hydrophilic side chain. Preferably, a polymer material selected from the group including polyvinyl alcohol, polyethylene glycol, polyacrylic acid and polyvinylbutyral (i.e., a polymer material which is 0.25 to 10 times, preferably 0.25 to 6 times, that of a molar number of all metal ions of the metal salt solution) is dissolved in distilled water to produce a chelating agent. With regard to the amount of the polymer material, if the amount is less than 0.25 times the number of total metal ions, a desired phase of the material is not formed, and if over 10 times the number of total metal ions, it is difficult for a gel to synthesize as a result of an excessively large coefficient of viscosity.

When the metal salt solution and the chelating solution are mixed, the polymer material is chelated in the metal ions such that the metal ions and the polymer material are equally distributed in the solution. A gel is formed by heating the mixed solution at 100 to 120° C. and evaporating the water therein.

Following the above, an organic-inorganic polymer precursor is produced by thermally decomposing the gel for 1 to 5 hours at a temperature between 300 and 400° C. to combine metal ions and polymer material. At this time, a rate of temperature increase is made as slow as possible, e.g. 1° C./minute. With regard to the limits placed on the thermal decomposition temperature, if the same is under 300° C., polymer dissolution of the chelating agent does not satisfactorily occur and a precursor of a uniform composition is not formed, whereas if over 400° C. it is possible for a crystalline material to be produced rather than the formation of the desired precursor. The precursor contains carbon and has a sub-micron particle size.

The precursor undergoes a first heat-treating process for 5–20 hours at a temperature between 700 and 900° C. and in an air or oxygen atmosphere to produce a $Li_xNi_{1-y}Co_yO_2$ positive electrode active material. With the heat treating of the precursor, a single phase active material, having no minor phase, is produced.

With the manufacture of the active material by heating treating a mixture of the lithium salt, cobalt salt and nickel salt as described above, a plurality of minute particles of 0.4 to 0.7 $\mu$m are collected to form large particles of 1to25 $\mu$m.

In the method described above, it is preferable to perform a second heat-treating process, following the first-heating process, for 8–10 hours at a temperature between 400 and 600° C. and in an air or oxygen atmosphere. By heat treating the compound a second time after the first heat-treating process, a crystal structure of the compound is stabilized such that the electrochemical characteristics of the battery manufactured using the inventive active material are improved. Also, by performing the second heat-treating process, the particle size of the active material is further decreased.

In addition, by the use of the organic polymer material as a chelating agent, a uniformity of a medium is ensured, and the particle size of the active material, the formation of the particles, and surface characteristics can be freely adjusted by altering a lithium equivalent.

The present invention will now be described in detail.

EXAMPLE 1

One mole of $LiNO_3$, 0.8 moles of $Ni(NO_3)_2$ $6H_2O$, and 0.2 moles of $Co(NO_3)$ $6H_2O$ were exactly measured, then dissolved in distilled water to produce a metal salt solution. A slightly black, clear solution resulted after the metal salt was fully dissolved in the distilled water. Next, a polyvinyl alcohol, which is a polymer material, of 0.5-times a number of moles of all metal ions was dissolved in distilled water to produce a chelating agent.

Subsequently, the metal salt and the chelating agent were mixed, and the resulting mixture was heated at roughly 110° C. to evaporate water from the mixture to produce a gel. The gel was then placed in an aluminous crucible and heat treated for three hours at roughly 300° C., thereby producing an organic-inorganic precursor in which the metal ions and the polymer material are combined.

The precursor then underwent a first heat-treating process in a dry air atmosphere for 12 hours at 750° C. to produce a crystalline material of $Li_{1.00}Ni_{0.8}CO_{0.2}$. The crystalline material underwent a second heat-treating process for 10 hours at 500° C. while dry air was blown on the material, resulting in positive electrode active material for lithium secondary batteries.

The active material for the positive electrode manufactured in the above was used to manufacture a coin cell.

EXAMPLE 2

Except for the use of 1.02 moles of $LiNO_3$, the same method as that used in Example 1 above was used to produce positive electrode active material for lithium secondary batteries of $Li_{1.02}Ni_{0.8}Co_{0.2}O_2$. The active material for the positive electrode manufactured in this manner was used to manufacture a coin cell.

EXAMPLE 3

Except for the use of 1.04 moles of $LiNO_3$ and conducting the second heat-treating process for 8 hours, the same method as that used in Example 1 above was used to produce positive electrode active material for lithium secondary batteries of $Li_{1.04}Ni_{0.8}Co_{0.2}{}_2O_2$. The active material for the positive electrode manufactured in this manner was used to manufacture a coin cell.

EXAMPLE 4

Except for the use of 1.06 moles of $LiNO_3$, the same method as that used in Example 1 above was used to produce positive electrode active material for lithium secondary batteries of $Li_{1.06}Ni_{0.8}Co_{0.2}O_2$. The active material for the positive electrode manufactured in this manner was used to manufacture a coin cell.

EXAMPLE 5

Except for the use of 0.95 moles of $LiNO_3$, 0.7 moles of $Ni(NO_3)_2$ $6H_2O$, and 0.3 moles of $Co(NO_3)$ $6H_2O$, the same method as that used in Example 1 above was used to produce positive electrode active material for lithium secondary batteries of $Li_{0.95}Ni_{0.7}Co_{0.3}O_2$. The active material for the positive electrode manufactured in this manner was used to manufacture a coin cell.

EXAMPLE 6

Except for the use of 1 mole of $LiNO_3$, the same method as that used in Example 5 above was used to produce positive electrode active material for lithium secondary batteries of $Li_{1.00}Ni_{0.7}Co_{0.3}O_2$. The active material for the positive electrode manufactured in this manner was used to manufacture a coin cell.

EXAMPLE 7

Except for the use of 1.04 moles of $LiNO_3$, the same method as that used in Example 5 above was used to produce positive electrode active material for lithium secondary batteries of $Li_{1.04}Ni_{0.7}Co_{0.3}O_2$. The active material for the positive electrode manufactured in this manner was used to manufacture a coin cell.

EXAMPLE 8

Except for the use of 1.06 moles of $LiNO_3$, the same method as that used in Example 5 above was used to produce positive electrode active material for lithium secondary batteries of $Li_{1.06}Ni_{0.7}Co_{0.3}O_2$. The active material for the positive electrode manufactured in this manner was used to manufacture a coin cell.

Figure 1B:
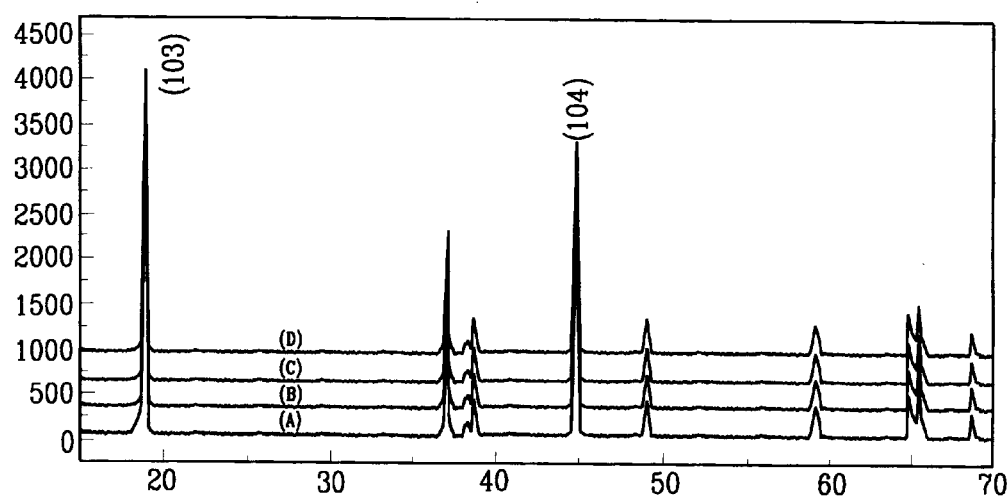

FIG. 1a is a graph illustrating an X-ray diffraction (XRD) pattern of the $Li_xNi_{0.8}Co_{0.2}O_2$ crystalline material manufactured according to Examples 1 to 4 of the present invention in which the material undergoes the first heat-treating process while an amount of lithium is adjusted; and FIG. 1b is a graph illustrating an XRD pattern of the $Li_xNi_{0.7}Co_{0.3}O_2$ crystalline material manufactured according to Examples 5 to 8 of the present invention in which the material undergoes the first heat-treating process while an amount of lithium is adjusted. As shown in FIGS. 1a and 1b, peaks of the produced materials occur at identical locations, regardless of how amounts of the lithium were varied from 0.95 to 1.06 moles, such that identical XRD patterns are formed for the active material manufactured using the methods of each of the examples. Accordingly, a structure of the produced materials is identical to that when adding 1 mole of lithium. In FIG. 1, the "*" sign represents Si standard peaks.

Figure 2A:
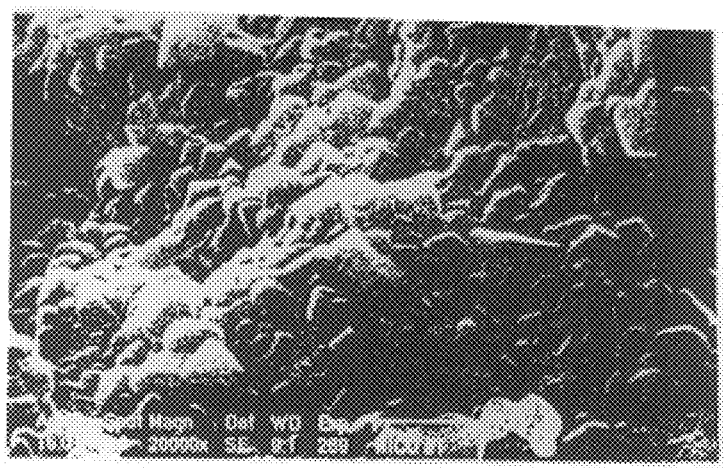
FIGS. 2a, 2b and 2c are SEM pictures of an active material precursor for a positive electrode used in secondary lithium batteries manufactured by adjusting a lithium salt equivalent according to the present invention.
Figure 2B:
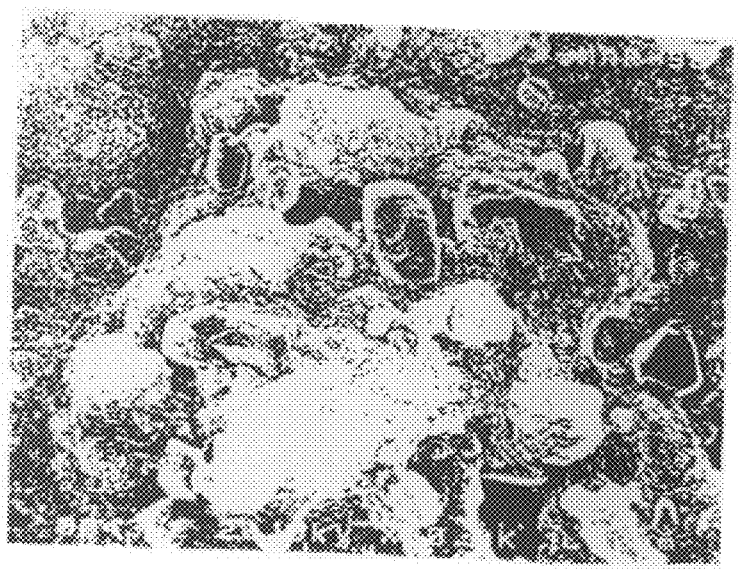
Figure 2C:
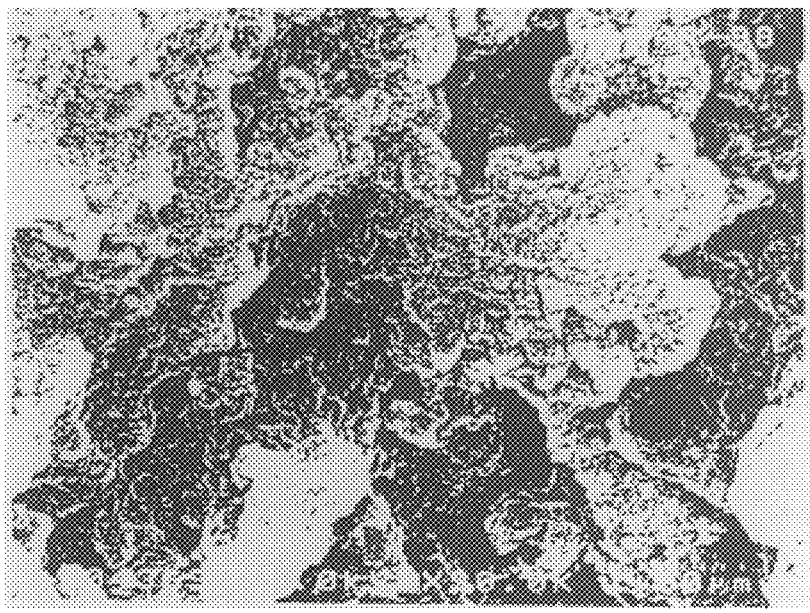

FIGS. 2a, 2b and 2c show SEM pictures of the active material precursors manufactured respectively according to the first, second and fourth examples, and magnified respectively 20000, 30000 and 30000 times. As shown in the drawings, the active material precursors produced according to the examples of the present invention are formed by particles of less than one micrometer in size.

Figure 3A:
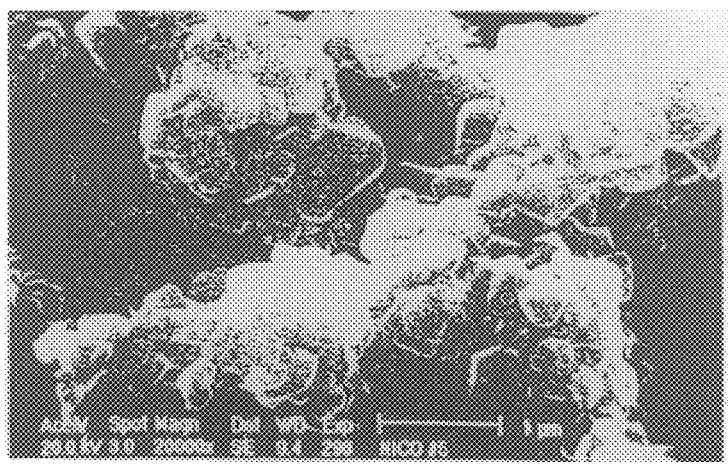
FIGS. 3a, 3b and 3c are SEM pictures of active material for a positive electrode used in secondary batteries manufactured by adjusting a lithium salt equivalent and having undergone a single heat-treating process according to the present invention.
Figure 3B:
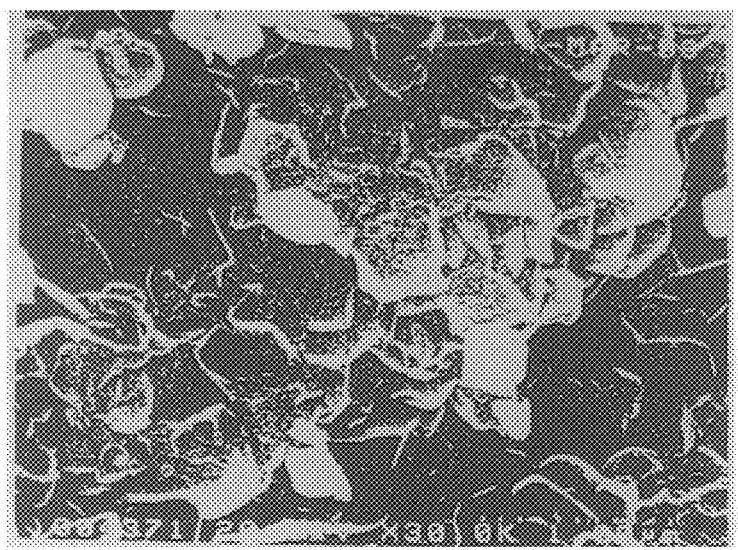
Figure 3C:
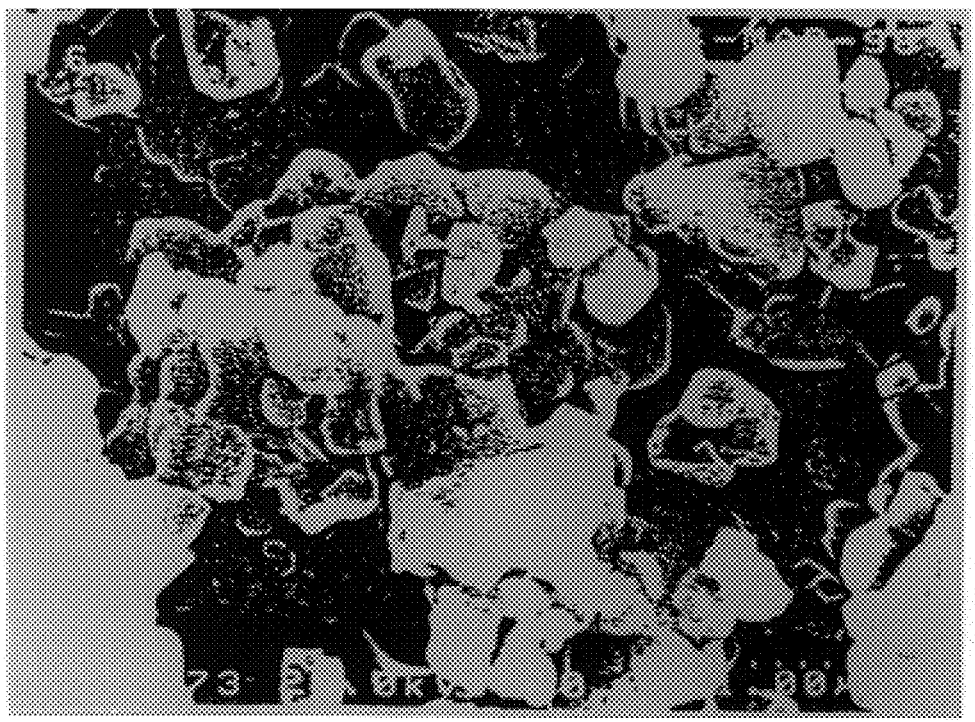

FIGS. 3a, 3b and 3c show SEM pictures of crystalline material having undergone the first heat-treating process respectively according to first, second and fourth examples of the present invention. FIGS. 3a, 3b and 3c illustrate magnifications of 20000, 30000 and 30000 times, respectively, for each the first, second and fourth examples. As shown in the drawings, the materials produced by altering the amount of lithium from 1.00, 1.02 and 1.06 moles for the first, second and fourth examples, respectively, are realized by the clustering of a plurality of minute particles to form larger particles. Sizes of the minute particles are uniform and range from 0.4 to 0.7 μm, and the minute particles group together to form the larger particles of 1 to 25 μm.

Figure 4A:
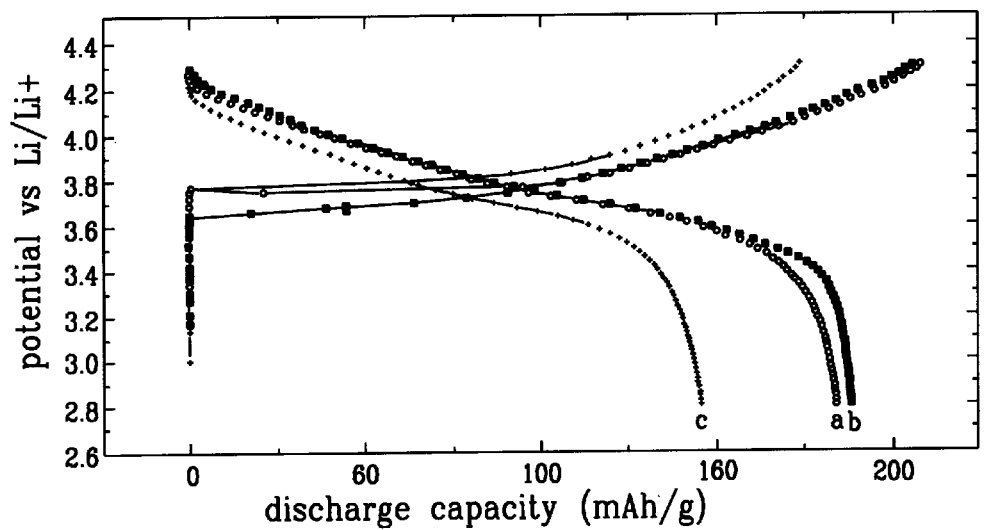
FIGS. 4a and 4b are graphs illustrating charge and discharge properties of a coin battery manufactured using active material for a positive electrode used in secondary batteries according to the present invention, the active material having undergone a single heat-treating process.
Figure 5A:
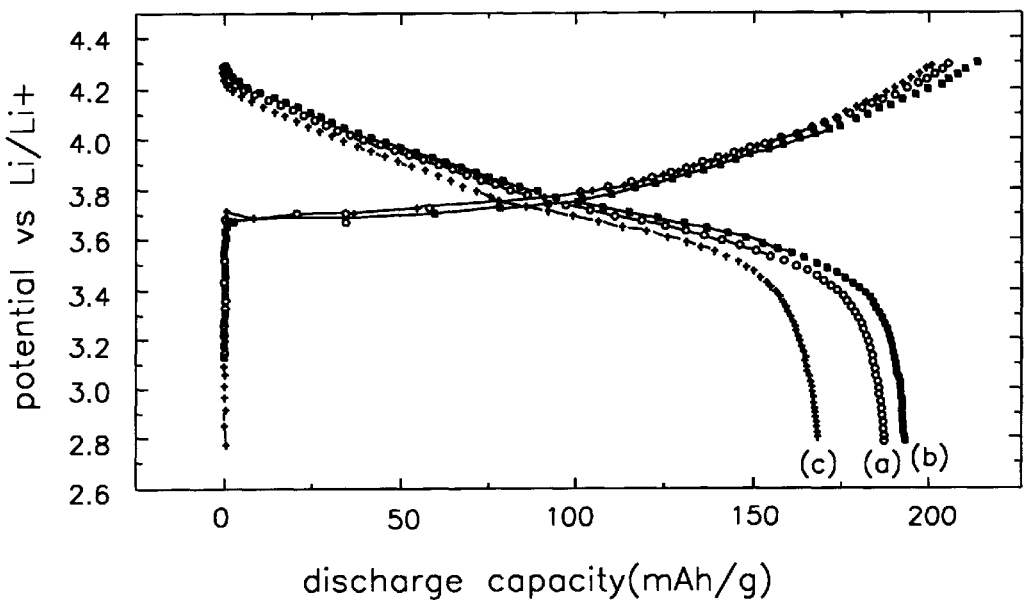
FIGS. 5a and 5b are graphs illustrating charge and discharge properties of a coin battery manufactured using active material for a positive electrode used in secondary batteries according to the present invention, the active material having undergone two heat-treating processes.

FIG. 4a shows a graph illustrating charge and discharge properties of a coin battery manufactured using the crystalline material (applied as the active material), having undergone the first heat-treating process, for a positive electrode of a secondary battery according to the present invention. In FIG. 4a, line (a) corresponds to a battery using the active material produced according to Example 1, line (b) corresponds to a battery using the active material according to Example 3, and line (c) corresponds to a battery using the active material according to Example 4. FIG. 5a shows a graph illustrating charge and discharge properties of a coin battery manufactured using the active material, having undergone the first and second heat-treating processes, for a positive electrode of a secondary battery according to the present invention. In FIG. 5a, line (a) corresponds to a battery using the active material produced according to Example 1, line (b) corresponds to a battery using the active material according to Example 3, and line (c) corresponds to a battery using the active material according to Example 4.

In FIGS. 4a and 5a, there are shown potential differences of battery capacities and Li/Li+ during charging and discharging at a speed of 0.1C in a range of 4.3–2.8V. As shown in the drawings, capacities of the batteries manufactured using the crystalline material, having undergone the first heat-treating process, as the active material for the positive electrode are approximately 184 mAh/g for Example 1, 188 mAh/g for Example 3 and 147 mAh/g for Example 4; whereas capacities of the batteries manufactured using the active material, having undergone the second heat-treating process, for the positive electrode are approximately 187 mAh/g for Example 1, 196 mAh/g for Example 3 and 168 mAh/g for Example 4. This is clearly indicative of an increase in battery capacities when the second heat-treating process is undertaken.

Figure 4B:
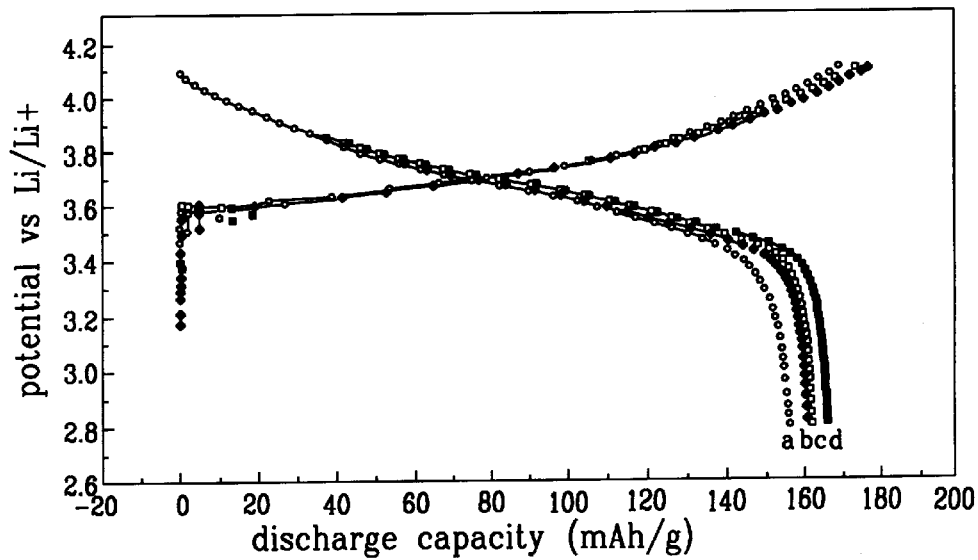
Figure 5B:
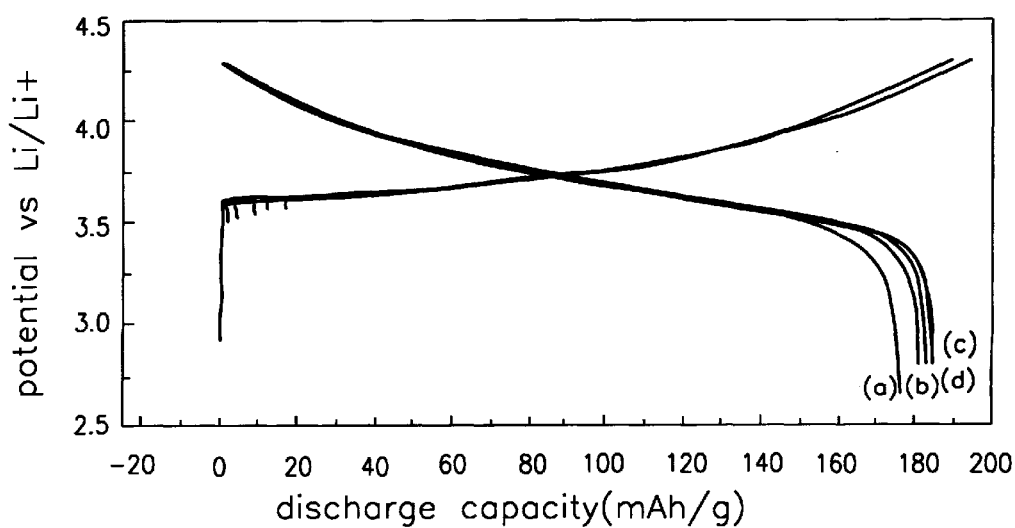

FIG. 4b shows a graph illustrating charge and discharge properties of a coin battery manufactured using the crystalline material (applied as the active material), having undergone the first heat-treating process, for a positive electrode of a secondary battery according to the present invention. In FIG. 4b, line (a) corresponds to a battery using the active material produced according to Example 5, line (b) corresponds to a battery using the active material according to Example 6, line (c) corresponds to a battery using the active material according to Example 7, and line (d) corresponds to a battery using the active material according to Example 8. FIG. 5b shows a graph illustrating charge and discharge properties of a coin battery manufactured using the active material, having undergone the first and second heat-treating processes, for a positive electrode of a secondary battery according to the present invention. In FIG. 5b, line (a) corresponds to a battery using the active material produced according to Example 5, line (b) corresponds to a battery using the active material according to Example 6, line (c) corresponds to a battery using the active material according to Example 7, and line (d) corresponds to a battery using the active material according to Example 8.

In FIGS. 4b and 5b, there are shown potential differences of battery capacities and Li/Li+ during charging and discharging at a speed of 0.1C in a range of 4.3–2.8V. As shown in the drawings, capacities of the batteries manufactured using the crystalline material, having undergone the first heat-treating process, as the active material for the positive electrode are approximately 155 mAh/g for Example 5, 162 mAh/g for Example 6, 166 mAh/g for Example 7, and 163 mAh/g for Example 8; whereas capacities of the batteries manufactured using the active material, having undergone the second heat-treating process, for the positive electrode are approximately 175 mAh/g for Example 5, 182 mAh/g for Example 6, 185 mAh/g for Example 7, and 183 mAh/g for Example 8. This is clearly indicative of an increase in battery capacities when the second heat-treating process is undertaken.

Further, in the case where the amount of lithium metal is 1.05 moles or less, capacities increase in tandem with increases in the amount of lithium ions. Accordingly, the optimum amount of lithium ions is 1.00<x<1.05.

In the $Li_xNi_{0.7}Co_{0.3}O_2$ manufactured according to Examples 5–8, the amount of Li, Ni and Co is fixed using ICP (inductive coupled plasma), and the results thereof are shown in Table 1 below.

TABLE 1

| | Li[mole %] | Ni[mole %] | Co[mole %] | Reference |
|---|---|---|---|---|
| Example 5 (x = 0.95) | 6.52/6.94 = 0.94 | 40.9/58.71 = 0.70 | 17.77/58.93 = 0.30 | $Li_{0.94}Ni_{0.70}Co_{0.3}O_2$ |
| Example 6 (x = 1.00) | 6.66/6.94 = 0.96 | 40.83/58.71 = 0.70 | 17.53/58.93 = 0.30 | $Li_{0.96}Ni_{0.70}Co_{0.3}O_2$ |
| Example 7 (x = 1.04) | 6.92/6.94 = 0.997 | 40.36/58.71 = 0.69 | 17.47/58.93 = 0.30 | $Li_{0.997}Ni_{0.69}Co_{0.3}O_2$ |
| Example 8 (x = 1.06) | 6.99/6.94 = 1.01 | 39.1/58.71 = 0.67 | 16.96/58.93 = 0.29 | $Li_{1.01}Ni_{0.67}Co_{0.29}O_2$ |

As shown in Table 1, when the $Li_{Ni0.7}Co_{0.3}O_2$ active material is manufactured according to Examples 5–8 while the amount of lithium is varied from 0.95 to 1.06 moles, the amount of Li in the resulting active material is roughly 0.94 to 1.06 moles.

Although the present invention has been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method of manufacturing active material of Formula 1 for a positive electrode used in lithium secondary batteries comprising the steps of:

adding a chelating agent to a mixture derived by dissolving lithium salt, nickel salt and cobalt salt in a solvent to a molar ratio of 0.95–1.06:0.5–1:0–0.5;

producing a gel by heating the mixture;

forming an organic-inorganic precursor by thermally decomposing the gel; and heat treating the precursor.

$$Li_xNi_{1-y}Co_yO_2 \qquad \text{[Formula 1]}$$

where x is between 0.95 and 1.06, and y is between 0 and 0.5.

2. The method of claim 1 wherein metal salt selected from the group consisting of Mg, Al and Mn is further added to the solvent.

3. The method of claim 1 wherein the chelating agent is selected from the group consisting of polyvinyl alcohol, polyethylene glycol, polyacrylic acid and polyvinylbutyral.

4. The method of claim 1 wherein the precursor is heat treated at a temperature between 700 and 900° C.

5. The method of claim 1 wherein the precursor undergoes a first heat-treating process at between 700 and 900° C., and a second heat-treating process at between 400 and 600° C.

* * * * *

UNITED STATES PATENT AND TRADEMARK OFFICE
CERTIFICATE OF CORRECTION

PATENT NO. : 6,210,834 B1
DATED : April 3, 2001
INVENTOR(S) : Kweon et al.

It is certified that error appears in the above-identified patent and that said Letters Patent is hereby corrected as shown below:

Title page,
Assistant Examiner's name, please delete "Jonathan John" and insert -- Johnathan Johnson --.
Item [57], ABSTRACT, line 9, delete "for precursor by" and insert -- forming an organic-inorganic precursor by --.

Column 8,
Line 49, please delete "heat treating the precursor." and insert -- heat treating the precursor, wherein Formula 1 is the following: --.

Signed and Sealed this

First Day of January, 2002

Attest:

Attesting Officer

JAMES E. ROGAN
Director of the United States Patent and Trademark Office